(12) United States Patent
Faulhaber et al.

(10) Patent No.: US 7,502,874 B2
(45) Date of Patent: Mar. 10, 2009

(54) METHODS AND SYSTEMS FOR INTEGRATING UNIQUE INFORMATION IN SAS INTERFACE COMPONENTS

(75) Inventors: Steven F. Faulhaber, Colorado Springs, CO (US); Joshua P. Sinykin, Colorado Springs, CO (US); Matthew K. Freel, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 343 days.

(21) Appl. No.: 11/562,228

(22) Filed: Nov. 21, 2006

(65) Prior Publication Data

US 2008/0120438 A1    May 22, 2008

(51) Int. Cl.
*G06F 3/00* (2006.01)
*G06F 17/50* (2006.01)

(52) U.S. Cl. .............. 710/13; 710/23; 710/62; 710/74; 716/12; 711/170

(58) Field of Classification Search ............... 710/8–13, 710/22–23, 62, 74, 104; 716/12–14; 711/170–173
See application file for complete search history.

(56) References Cited

U.S. PATENT DOCUMENTS

| | | | | |
|---|---|---|---|---|
| 5,710,934 A * | 1/1998 | Bona et al. | ............... | 714/724 |
| 6,118,938 A * | 9/2000 | Lawman et al. | ............... | 716/16 |
| 6,651,344 B2 * | 11/2003 | Cheng | ............... | 30/159 |
| 7,143,376 B1 * | 11/2006 | Eccles | ............... | 716/5 |
| 7,197,735 B2 * | 3/2007 | Martin et al. | ............... | 716/8 |
| 7,210,065 B2 * | 4/2007 | Uddenberg et al. | ............... | 714/33 |
| 7,353,302 B2 * | 4/2008 | Seto | ............... | 710/36 |
| 7,363,395 B2 * | 4/2008 | Seto | ............... | 710/11 |
| 7,444,445 B2 * | 10/2008 | Kubo et al. | ............... | 710/104 |
| 2005/0193178 A1 * | 9/2005 | Voorhees et al. | ............... | 711/149 |
| 2006/0101171 A1 * | 5/2006 | Grieff et al. | ............... | 710/36 |
| 2006/0155944 A1 * | 7/2006 | Kano | ............... | 711/161 |
| 2008/0148215 A1 * | 6/2008 | Gutberlet et al. | ............... | 716/18 |

* cited by examiner

*Primary Examiner*—Christopher B Shin
(74) *Attorney, Agent, or Firm*—Duft Bornsen & Fishman LLP

(57) ABSTRACT

Methods and systems for customizing information in a memory associated with a SAS host bus adapter ("HBA"). A SAS HBA typically includes a memory component that stores information common to all SAS HBA's manufactured by a particular vendor (e.g., common instructions and data). In addition, each HBA memory component typically includes some information unique to each HBA (e.g., board trace number, SAS address, configuration page, boot record, etc.). Features and aspects hereof permit pre-programmed memory components to be integrated with a SAS HBA to eliminate a step to program an assembled HBA through a specialized, one-time interaction to add required unique information. Thus a manufacturer may simply integrate a pre-programmed memory component to an otherwise completed HBA assembly to complete the product manufacturing without need for a special programming step. Or a design or test engineer may simply replace a memory component to change unique information on the HBA.

15 Claims, 3 Drawing Sheets

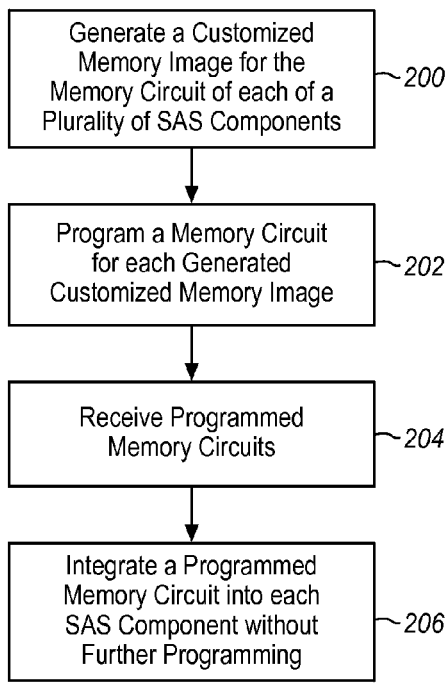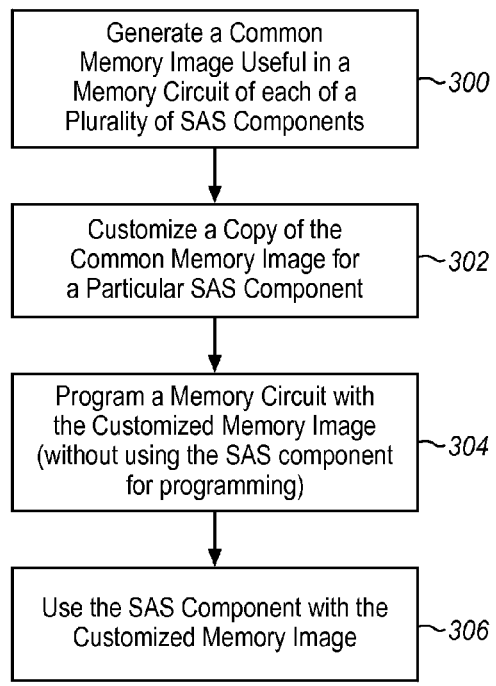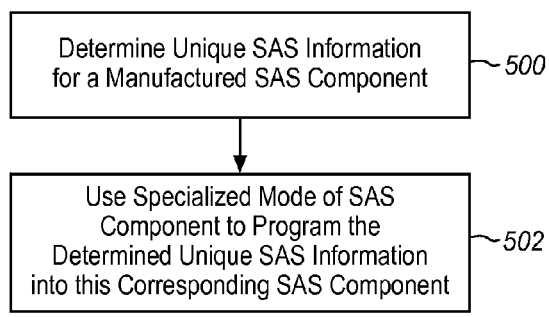

METHODS AND SYSTEMS FOR INTEGRATING UNIQUE INFORMATION IN SAS INTERFACE COMPONENTS

BACKGROUND

1. Field of the Invention

The invention relates generally to serial attached SCSI ("SAS") devices and more specifically relates to improvements in integrating a desired SAS address and/or other unique information into a SAS component such as at time of manufacture or design/debug.

2. Discussion of Related Art

It is generally known in the computing industry that peripheral interface circuit boards or integrated circuits are coupled with general or special purpose processors to provide I/O interfacing to peripheral devices by the general or special purpose processor. One common interface utilized for coupling storage peripheral devices to a processor is the SAS interface. SAS comprises a family of standards for coupling high speed peripheral devices (such as storage devices) to computing systems or processors. For example, many present-day high performance disk drives utilize the SAS communication protocol standards through appropriate high speed serial communication media to permit high-speed exchange of information between the processor or computing system and an attached storage peripheral device.

In accordance with the SAS specifications a SAS initiator device establishes connections to one or more SAS target devices through zero or more intermediate SAS expander devices. A collection of interconnected SAS initiators, SAS targets, and SAS expanders are generally referred to as a SAS domain. Within a SAS domain, each component (e.g., SAS initiator, SAS target, or SAS expander) is identified by a unique SAS address. The unique SAS address is typically determined by the manufacturer of the SAS peripheral device and encoded within a suitable nonvolatile memory associated with the SAS device by the manufacturer thereof. Other information unique to the particular SAS component such as board trace number, configuration page, boot record, etc. may also be programmed within the non-volatile memory component of the SAS component. In addition, some common elements such as common data values and programmed instructions may also be programmed within the same memory component or may be programmed in other memory components of the SAS component.

For example, a data processing system may perform the role of a SAS initiator by integrating a SAS interface chip or SAS host bus adapter (typically including a SAS interface chip). The SAS interface integrated circuit and/or SAS host bus adapter utilizing such an integrated circuit is programmed at some point in the manufacturing process to embed the unique SAS address and other unique information. International standards organizations and/or trade associations are typically responsible for assigning ranges of predefined SAS addresses for use by manufacturers in producing their SAS related circuits and components. Thus, in the manufacturing process, a manufacturer selects a next available SAS address to be associated with each produced SAS component.

The design of a SAS component (such as a SAS expander, a SAS host bus adapter, or other SAS components) often includes a customized integrated circuit design by the component manufacturer. The integrated circuit often includes a memory component (e.g., non-volatile memory) in which customized information is embedded (such as the SAS address, etc.). Many manufacturers of SAS components utilize a third party vendor to actually fabricate the integrated circuit design—(e.g., a chip foundry).

As presently practiced it is common for the SAS component manufacturer to provide a design file to the chip foundry to facilitate fabrication of the SAS interface chip to be integrated with their SAS component design. It is further common for the SAS component manufacturer/designer to supply a single design file to be used by the chip foundry in fabrication of a plurality of identical SAS interface integrated circuits. In other words, a single integrated circuit design is provided to the chip foundry essentially devoid of pre-programmed SAS address information. The plurality of identical, un-programmed SAS interface chips may then be returned from the chip foundry vendor to the SAS component manufacturer/designer for appropriate programming of the required SAS address and other information unique to the particular SAS component which will utilize the circuit. The SAS component manufacturer/designer then utilizes the SAS component in a special programming mode to permit programming of the required unique information into the SAS interface integrated circuit provided by the chip foundry. Thus the SAS component manufacturer/designer must perform specialized tasks solely for the purpose of programming the supplied integrated circuit interface chip of the SAS component. Such specialized tasks require additional time and may require particular additional tools and thus may negatively impact the cost of the SAS component.

It is evident from the above discussion that a need exists for improved methods and systems for initially programming or defining the SAS address and other unique information a SAS component.

SUMMARY

The present invention solves the above and other problems, thereby advancing the state of the useful arts, by providing methods and systems for manufacturing SAS components having unique SAS information programmed in a memory circuit within the SAS component.

One feature hereof provides a method for embedding information in a SAS component. The method includes generating a memory image useful for a plurality of SAS components and then customizing the memory image for a particular SAS component to generate a customized memory image that is unique to the particular SAS component. The method further includes programming a programmable memory device with the customized memory image to generate a customized programmable memory device and using the programmable memory device in the particular SAS component. The method step of programming is operable without operating the particular SAS component.

Another feature hereof provides a method for manufacturing a plurality host bus adapters. The method includes generating a plurality of customized memory image files each customized with information unique to a corresponding host bus adapter of the plurality of host bus adapters. The method then includes programming a programmable memory device associated with each host bus adapter using a customized memory image file corresponding with each host bus adapter. The method step of programming is operable using means other than the corresponding each host bus adapter.

Another feature hereof provides a method for manufacturing a plurality of SAS host bus adapters. The method includes generating a plurality of customized memory images to be programmed into a corresponding plurality of memory components. Each customized memory image includes information common to all of the plurality of SAS host bus adapters and each customized memory image further includes customized information unique to a corresponding one of the plurality of SAS host bus adapters. The method then includes programming the plurality of customized memory images into the corresponding plurality of memory components. The step of programming may be performed by a manufacturer of memory circuits. The method then continues with receiving a plurality of customized memory components from the manufacturer of memory circuits. The method then concludes with integrating each of the plurality of customized memory components with a corresponding SAS host bus adapter without requiring further programming of any unique information in the SAS host bus adapters.

BRIEF DESCRIPTION OF THE DRAWINGS

FIG. 2 is a flowchart of an exemplary business method in accordance with features and aspects hereof to manufacture SAS components with customized unique SAS information.

FIG. 3 is a flowchart of an exemplary method in accordance with features and aspects hereof to generate customized memory images for SAS components and to manufacture SAS components with customized memory images including unique SAS information.

FIG. 5 is a flowchart describing an exemplary method for manufacturing SAS component with unique SAS information as presently practiced in the art.

DETAILED DESCRIPTION OF THE DRAWINGS

Figure 1:
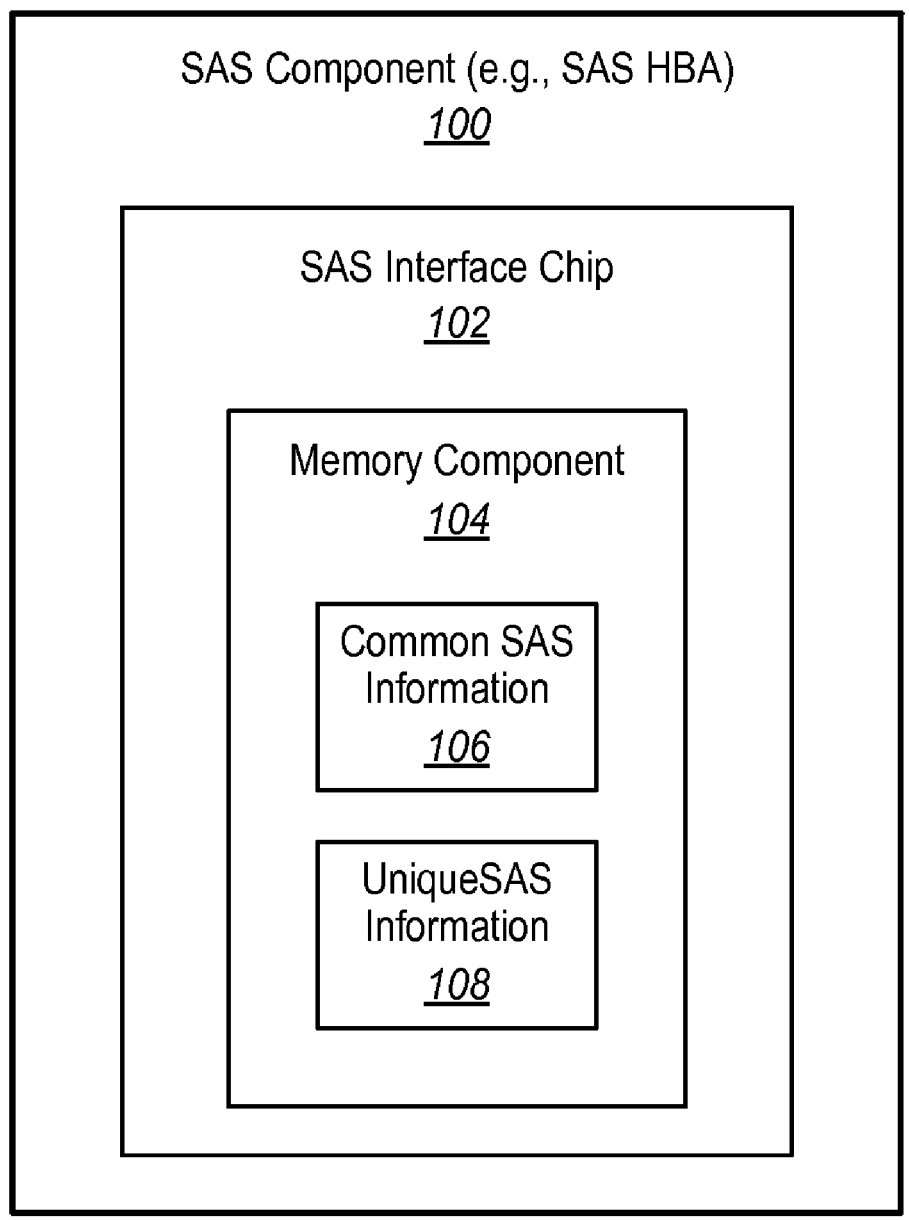
FIG. 1 is a block diagram of an exemplary SAS component as presently known in the art.

FIG. 1 is a block diagram of a typical SAS component 100 as presently practiced in the art. SAS component 100 may be, for example, a SAS host bus adapter ("HBA"—i.e., any SAS initiator device) or any other SAS component such as a SAS expander or SAS target device. As is common practice for manufacturers of SAS components, SAS component 100 may include a SAS interface circuit/chip 102 custom designed or commercially available to provide SAS related protocol management. Associated with, or integrated with, SAS interface chip 102 is a memory component 104 providing nonvolatile storage for information associated with operation of SAS component 100. The information stored in memory component 104 may include common SAS information 106 common to each SAS component 100 produced by the particular vendor or manufacture. In addition, unique SAS information 108 may also be stored in memory component 104 unique to each particular SAS component 100 produced by the manufacturer/vendor.

Memory component 104 may be any suitable programmable memory device adapted for storing unique SAS information 108 and optionally further adapted for storing common SAS information 106. Memory component 104 may therefore represent a flash memory device or any other form of electronically programmable memory element including, for example, programmable read-only memory devices of various types and one time programmable memory components.

Exemplary common SAS in information may include programmed instructions executed by a processor associated with the SAS component 100 (e.g., often integrated within SAS interface chip 102). Other exemplary common SAS information may include a variety of data used in SAS communications. Exemplary unique SAS information 108 may include, the SAS address utilized in SAS communications to uniquely identify each SAS component in a SAS domain. In addition, other examples of unique SAS information 108 may include a board trace number (e.g., serial number) to serialize each of the manufactured products, a configuration page used to configure particular features and operation of SAS component 100, and/or a boot record useful when initially starting SAS component 100 to perform initial power on reset configuration operations.

Those of ordinary skill in the art will readily recognize numerous additional elements provided within a typical, fully functional SAS component 100. Such additional elements are well known to those of ordinary skill in the art and are omitted herein merely for brevity and simplicity of this discussion.

As noted above and as presently practiced in the art, the unique SAS information 108 stored within, and utilized by a SAS component 100 is typically programmed into the nonvolatile memory component 104 by operating the manufactured SAS component 100 in a specialized programming or diagnostic mode. FIG. 5 exemplifies such a manufacturing process as presently practiced wherein the SAS component is utilized in a specialized mode for purposes of programming unique SAS information into an integrated memory component. Element 500 of FIG. 5 is first operable to determine unique SAS information to be programmed into the memory circuit of a particular SAS component. When the manufacturer/vendor mass produces a plurality of such SAS components, customized, unique SAS information is determined for each such mass produced SAS component. The unique SAS information may include, among other things, a unique SAS address.

Element 502 then represents processing as presently practiced in the art to program the memory component of a SAS component with the determined unique SAS information corresponding to that SAS component. However, as presently practiced in the art, element 502 represents processing whereby the SAS component is fully manufactured/assembled and operated in a specialized diagnostic or programming mode to permit programming of the memory component integrated with that particular SAS component. In some cases, the specialized programming mode may utilize a specialized communication port integrated with the SAS component utilized exclusively for the specialized programming and diagnostic purpose. In other cases, specialized command exchanges may be performed over other communication channels normally utilized by the SAS component. The normal communication channels are utilized with specialized commands intended strictly for initial programming of the unique SAS information into the integral memory component of the SAS component.

The processing of FIG. 5 also represents analogous steps utilized by a design or test engineer to reprogram customized unique SAS information into a previously programmed SAS component. For example, in design or manufacturing test procedures, an engineer may wish to periodically change the unique SAS information in a SAS component. In accordance with present practices as exemplified by FIG. 5, such reprogramming utilizes specialized communications and/or commands supported by the completed, assembled SAS component.

By contrast, features and aspects hereof provide for programming of custom, unique SAS information into a memory component of a SAS component prior to the memory component's integration with the SAS component (e.g., by programming means external to the SAS component, per se).

These features and aspects simplify the manufacturing and test of SAS components by eliminating the need for specialized programming sequences and/or specialized communication ports involving the fully assembled SAS component. Eliminating such a need simplifies processing in that no special programming steps are required by the manufacturing process or by manufacturing or design engineers in a test environment. Rather, the customized, unique SAS information is programmed directly into the memory circuits prior to integration of the memory circuit into the SAS component.

FIG. 2 represents a method of doing business associated with the manufacture and assembly of a SAS component (such as a SAS host bus adapter). The vendor/manufacturer of the HBA typically designs a customized circuit for SAS interfacing and a nonvolatile memory used for storing unique SAS information associated with that particular manufactured SAS component/HBA. The memory circuit may be integral within the custom designed SAS interface circuit or may be externally coupled to the customized SAS interface circuit and separately integrated within the SAS component/HBA. Such design choices are well known to those of ordinary skill in the art.

Typically such a memory circuit (distinct from or integrated with the custom SAS interface circuit design) is provided by the HBA manufacturer/vendor to a third party integrated circuit manufacturer (e.g., a "chip foundry"). In accordance with features and aspects hereof, the third party chip foundry may pre-program the memory circuit associated with each of the plurality of SAS components with the unique SAS information associated with a corresponding SAS component. Thus, completed, pre-programmed memory circuits are provided from the chip foundry to the SAS component manufacturer/vendor for integration onto the SAS component/HBA during final assembly. No further specialized programming steps are required of the SAS component manufacturer/vendor to complete assembly of the SAS component/HBA.

More specifically, element 200 of FIG. 2 represents a step of generating a custom memory image for the memory circuit associated with each of a plurality of SAS components. The custom memory image is modified based on a standardized, common memory image to incorporate unique SAS information associated with each particular SAS component. As noted above, such unique SAS information may include, for example, the unique SAS address, a unique board trace number, unique configuration page data, and/or unique boot record information.

Those of ordinary skill in the art will note that method step 200 may be performed by either the manufacturer/vendor of the SAS component or may be performed by the third party "chip foundry" vendor engaged to produce the customized memory circuits to be associated with the plurality of SAS components. Where processing of step 200 is performed by the SAS component manufacture/vendor, a plurality of customized memory image files may be produced and sent to the chip foundry third party vendor—one customized memory image file associated with each memory circuit to be fabricated by the chip foundry vendor. By contrast, where the processing of step 200 is performed by the third party chip foundry vendor, the third party chip foundry vendor may be provided with a special program adapted to generate a plurality of customized memory image files from a base, common memory image file and a log of unique SAS information records to be integrated with copies of the base, common memory image file. Thus, as a matter of design choice, the business step of generating the plurality of custom memory images—one for each of a plurality of SAS components—may be performed equivalently either by the SAS component manufacturer/vendor or by a third party chip foundry vendor.

Element 202 represents a business method step whereby the third party chip foundry vendor utilizes the plurality of generated custom memory image files to program a corresponding memory circuit for each of the plurality of SAS components. As noted above, method step 202 may be performed by the chip foundry third party vendor so that completed, pre-programmed memory circuits may be provided to the SAS component manufacturer/vendor for final assembly/integration into the SAS component. By contrast to prior methods, the SAS component manufacturer/vendor no longer needs to perform additional specialized programming steps utilizing specialized interfaces or procedures associated with the completed SAS component to program customized, unique SAS information into each completed SAS component. Rather, final assembly of the SAS component including the pre-programmed memory circuits provided by the third party chip foundry vendor is all that is required to complete manufacture of the SAS component.

Thus, element 204 represents the business method step wherein the SAS component manufacturer receives the pre-programmed memory circuits from the third party chip foundry vendor. Lastly, element 206 represents the step performed by the SAS component manufacturer/vendor to integrate the pre-programmed memory circuits received from the chip foundry third party vendor into the final assembly of the SAS component. It is noted that this final step, by contrast to prior methods, does not require any specialized programming or interaction with the completed SAS component to provide the customized unique SAS information to the SAS component. Rather, final assembly to integrate the pre-programmed memory circuit is all that is required to complete assembly and manufacturing of the SAS component.

Those of ordinary skill will also recognize that the business method represented by FIG. 2 may simply involve steps performed by different groups within a single business enterprise. In other words, there need not exist a third party "arm's length" chip foundry vendor, Rather a chip fabrication group or function with an enterprise may supply the pre-programmed memory circuits to the SAS component manufacturing group or function within the same business enterprise.

FIG. 3 represents a method in accordance with features and aspects hereof for embedding unique information into a SAS component. FIG. 3 also represents a method for manufacturing a plurality of SAS components such as SAS host bus adapters, SAS expanders, etc. Element 300 represents processing to generate a common or base memory image file including common SAS information useful in every SAS component to be manufactured by the manufacturer/vendor. Such common information, as noted above, may include programmed instructions and other common data utilized in a SAS component such as a SAS host bus adapter. Element 302 then customizes a copy of the base or common memory image file for use in a particular SAS component. Processing of element 302 therefore adds unique SAS information to the copied memory image file to generate a customized memory image file useful for a particular SAS component. The unique SAS information, as noted above, and may include SAS address information, board trace number information, configuration page information, and/or boot record information.

Element 304 then represents processing to program a memory circuit associated with a particular SAS component utilizing the customized memory image file including unique SAS information for that particular SAS component. As noted above, this step of programming is performed substantially devoid of processing by the SAS component. In other words, the SAS component need not be operable to perform the programming of step 304. As noted above, typically such a programming step may be performed by a third party chip foundry engaged to mass produce memory circuits associated with the SAS interface circuitry. The memory circuits may be produced including pre-programmed SAS information that has unique SAS information for a particular SAS component and any required common SAS information. Lastly, element 306 represents utilization of the completed, assembled SAS component including its programmed customized memory image. Such utilization entails normal utilization of the SAS component such as for communication in an associated SAS domain.

Figure 4:
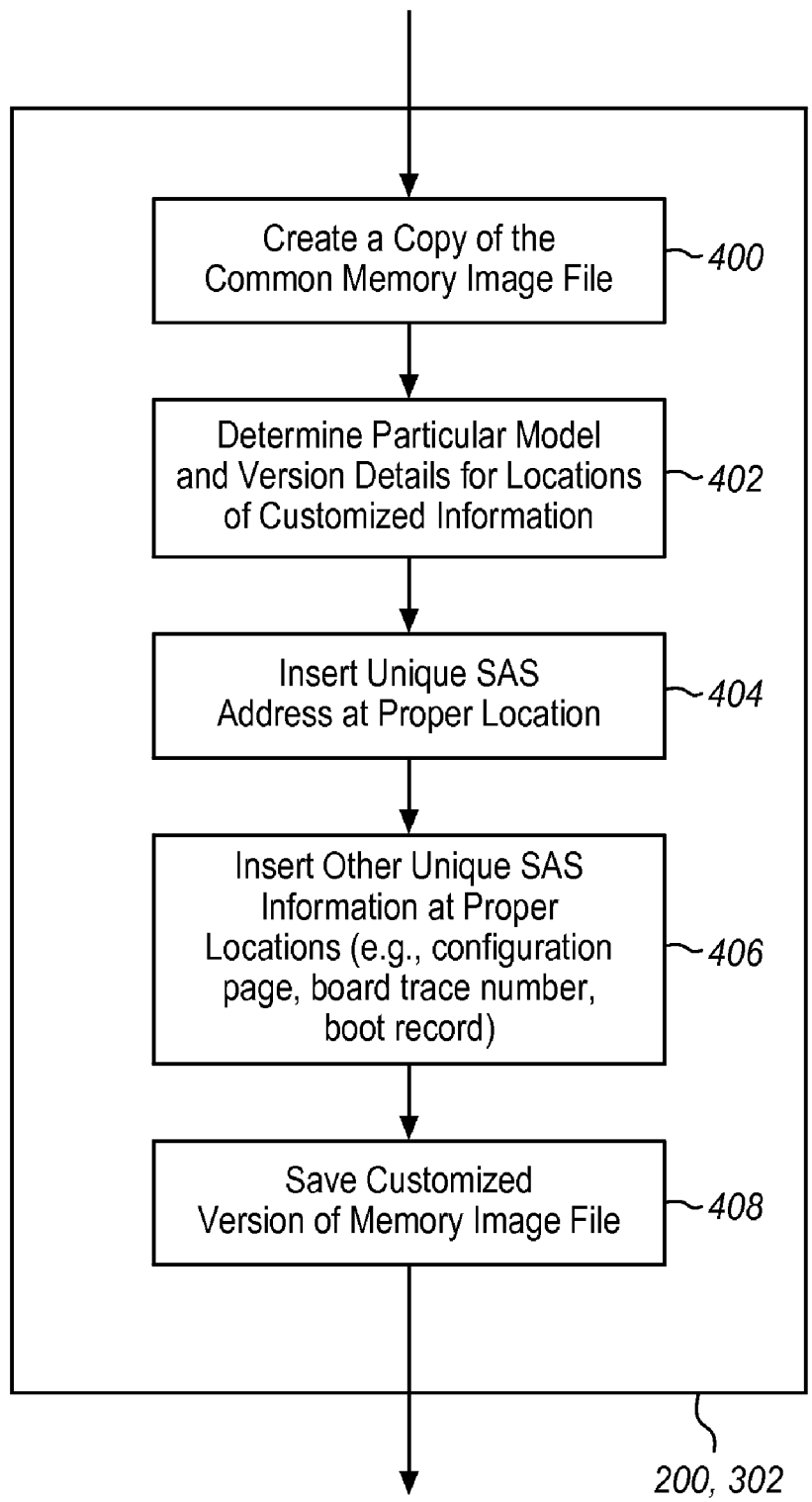
FIG. 4 is a flowchart providing exemplary additional details of processing of elements of FIGS. 2 and 3 to generate a customized memory image including unique SAS information.

FIG. 4 is a flowchart providing additional exemplary details of the processing of elements 200 or 302 above in FIGS. 2 and 3, respectively. As discussed above, element 200 of FIG. 2 and element 302 of FIG. 3 are generally operable to generate a customized memory image file based upon a provided common memory image and supplied unique SAS information to be incorporated with a copy of the common or base memory image file. Element 400 is therefore first operable to create a new copy of a supplied common memory image file. As noted above, the common memory image file may include any required common SAS information such as programmed instructions and common data useful in operation of any of a plurality of similar SAS components. Element 402 next determines details of a particular model and version needed to determine location and structure of the customized information to be inserted into the newly created copy of the common memory image file. Well known heuristic techniques may be utilized to determine from the memory image file exactly where particular unique SAS information is to be inserted to create the customized copy of the common memory image file. Such detailed information is typically determined by observing model and/or version information encoded at pre-determined fixed locations of the supplied common memory image file. Thus, a single computer program may be utilized for generating customized memory image files for any of the plurality of different kinds of SAS components produced by the SAS component manufacturer/vendor.

Having so determined details for the location of unique SAS information, element 404 is operable to insert the unique SAS address at the proper location in the newly copied memory image file. As noted above and as well known in the art, each SAS component manufactured by a particular manufacture/vendor includes a unique SAS address. Thus element 404 modifies the newly copied common memory image file to customize the memory image file to include the specified SAS address unique to the particular SAS component. Element 406 is then operable to insert other customized information at associated proper locations in the newly copied, customized memory image file. Lastly, element 408 saves the customized version of the memory image file in association with its particular SAS component. The saved, customize memory image file may then be used by the chip foundry third party vendor to program the unique SAS information into the memory circuit of the SAS component. Thus, the pre-programmed memory circuits may be provided by the chip foundry third party vendor to the SAS component manufacturer for final assembly and integration into the SAS component.

Those of ordinary skill in the art will readily recognize numerous equivalent method steps to those expressed above with respect to FIGS. 2 through 4. In addition, numerous additional steps will be readily apparent to those of ordinary skill in the art in a fully functional method to generate customized memory image files for memory circuits associated with the plurality of SAS components and to program the memory circuits in advance of final assembly and integration of the SAS component. Such additional steps have been omitted herein merely for the sake of simplicity and brevity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method for embedding information in a SAS component, the method comprising:

generating a memory image useful for a plurality of SAS components;

customizing the memory image for a particular SAS component to generate a customized memory image that is unique to the particular SAS component;

programming a programmable memory device with the customized memory image to generate a customized programmable memory device; and using the programmable memory device in the particular SAS component, wherein the step of programming is operable without operating the particular SAS component.

2. The method of claim 1
wherein the step of programming further comprises:
programming the programmable memory device physically external to the particular SAS component.

3. The method of claim 1
wherein the step of programming further comprises:
programming the programmable memory device while the programmable memory device is physically integrated into the particular SAS component but without operating the particular SAS component to perform the programming step.

4. The method of claim 1
wherein the step of customizing further comprises:
adding a supplied SAS address to the memory image to generate the customized memory image.

5. The method of claim 1
wherein the step of customizing further comprises:
adding a supplied board trace number to the memory image to generate the customized memory image.

6. The method of claim 1
wherein the step of customizing further comprises:
adding a supplied configuration page to the memory image to generate the customized memory image.

7. The method of claim 1
wherein the step of customizing further comprises:
adding a supplied boot record to the memory image to generate the customized memory image.

8. A method for manufacturing a plurality of SAS host bus adapters, the method comprising:

generating a plurality of customized memory images to be programmed into a corresponding plurality of memory component wherein each customized memory image includes information common to all of said plurality of SAS host bus adapters and wherein each customized memory image further includes customized information unique to a corresponding one of said plurality of SAS host bus adapters;

programming the plurality of customized memory images into the corresponding plurality of memory components wherein the step of programming is performed by a manufacturer of memory circuits;

receiving a plurality of customized memory components from the manufacturer of memory circuits; and integrating each of the plurality of customized memory components with a corresponding SAS host bus adapter without requiring further programming of any unique information in the SAS host bus adapters.

9. The method of claim 8
wherein the step of generating further comprises:
using a computer program to generate each customized memory image from a common memory image and from supplied unique information corresponding to each customized memory image.

10. The method of claim 9
wherein the step of using is performed by the manufacturer of memory circuits.

11. The method of claim 9
wherein the step of using is performed by the manufacturer of the SAS host bus adapters, and
wherein the method further comprises:
providing the plurality of customized memory images to the manufacturer of memory components prior the step of programming.

12. The method of claim 8
wherein the step of generating further comprises:
adding unique information comprising a supplied SAS address for a particular host bus adapter to an un-customized memory image file to generate the customized memory image file corresponding to the particular host bus adapter.

13. The method of claim 8
wherein the step of generating further comprises:
adding unique information comprising a supplied board trace number for a particular host bus adapter to an un-customized memory image file to generate the customized memory image file corresponding to the particular host bus adapter.

14. The method of claim 8
wherein the step of generating further comprises:
adding unique information comprising a supplied configuration page for a particular host bus adapter to an un-customized memory image file to generate the customized memory image file corresponding to the particular host bus adapter.

15. The method of claim 8
wherein the step of generating further comprises:
adding unique information comprising a supplied boot record for a particular host bus adapter to an un-customized memory image file to generate the customized memory image file corresponding to the particular host bus adapter.

* * * * *